US008087295B2

(12) United States Patent
Netzer (10) Patent No.: US 8,087,295 B2
(45) Date of Patent: Jan. 3, 2012

(54) DUAL-AXIS RESONATOR GYROSCOPE

(75) Inventor: Yishay Netzer, Moshav Yuvalim (IL)

(73) Assignee: Yishay Sensors Ltd., Yuvalim (IL)

( * ) Notice: Subject to any disclaimer, the term of this patent is extended or adjusted under 35 U.S.C. 154(b) by 626 days.

(21) Appl. No.: 12/282,006

(22) PCT Filed: Mar. 13, 2007

(86) PCT No.: PCT/IL2007/000320
§ 371 (c)(1),
(2), (4) Date: Sep. 8, 2008

(87) PCT Pub. No.: WO2007/105211
PCT Pub. Date: Sep. 20, 2007

(65) Prior Publication Data
US 2009/0056443 A1  Mar. 5, 2009

Related U.S. Application Data

(60) Provisional application No. 60/781,115, filed on Mar. 13, 2006.

(51) Int. Cl.
*G01P 9/04* (2006.01)
*G01C 19/56* (2006.01)
(52) U.S. Cl. .................................. 73/504.12; 73/504.04
(58) Field of Classification Search ............... 73/504.12, 73/504.13, 504.14, 504.15, 504.16, 504.02, 73/504.04
See application file for complete search history.

(56) References Cited

U.S. PATENT DOCUMENTS

| | | | |
|---|---|---|---|
| 5,763,781 A | 6/1998 | Netzer | |
| 5,955,668 A * | 9/1999 | Hsu et al. | 73/504.12 |
| 6,155,115 A * | 12/2000 | Ljung | 73/504.12 |
| 6,164,134 A * | 12/2000 | Cargille | 73/504.02 |
| 6,378,369 B1 * | 4/2002 | Takata et al. | 73/504.14 |
| 6,443,008 B1 * | 9/2002 | Funk et al. | 73/504.12 |
| 6,901,799 B2 * | 6/2005 | Chen et al. | 73/504.13 |
| 6,944,931 B2 | 9/2005 | Shcheglov et al. | |
| 7,155,976 B2 * | 1/2007 | Kai-Cheng et al. | 73/504.04 |
| 7,260,991 B2 * | 8/2007 | Maurer et al. | 73/535 |
| 7,325,451 B2 * | 2/2008 | Blomqvist | 73/504.04 |
| 7,401,517 B2 * | 7/2008 | Pan et al. | 73/504.16 |

OTHER PUBLICATIONS

Huikai Xie and Gary Fedder "Integrated Micro electromechanical Gyroscopes", Journal of Aerospace Engineering, pp. 65-75 Apr. 2003.
Cenk Acar and Andrei Shkel "An Approach for increasing Drive— Mode Bandwidth of MEMS Vibratory Gyroscopes" Journal of microelectromechanical systems, vol. 14, No. 3 Jun. 2005.

* cited by examiner

*Primary Examiner* — Helen C. Kwok
(74) *Attorney, Agent, or Firm* — Mark M. Friedman (57) ABSTRACT

The present invention discloses an improved planar, dual-axis, resonator gyroscope with mechanical coupling of adjacent vibrating members. The primary-mode flexible hinges include a tangential torsion element that largely decouples the out-of-plane resonant frequency from the wafer thickness. The use of separate plates for the force-balance and for the electric spring enables decoupling of the two functions. The invention also provides resonant frequency servo-loop for locking of the sense-mode resonant frequency to the drive-mode frequency, an online self-test, a split force balance loop for self cancellation of the quadrature signal, decoupling of the force-balance and resonant frequency servo-loops and stabilization of the inertial rate-sensing sensitivity—when operated in an open loop mode, all without interfering with the normal operation of the gyroscope. An optional sensing of the Z-axis acceleration perpendicular to the sensor plane is also provided which can be used for compensating acceleration-induced errors.

4 Claims, 8 Drawing Sheets

Prior art

DUAL-AXIS RESONATOR GYROSCOPE

FIELD AND BACKGROUND OF THE INVENTION

The present invention relates to a dual-axis resonator gyroscope and corresponding methods of operation.

Resonator (Coriolis) gyroscopes are well known, a comprehensive review of the current technology can be found in Huikai Xie and Gary Fedder "Integrated Micro electromechanical Gyroscopes", Journal of Aerospace Engineering April 2003 and in U.S. Pat. No. 6,944,931.

Figure 1:
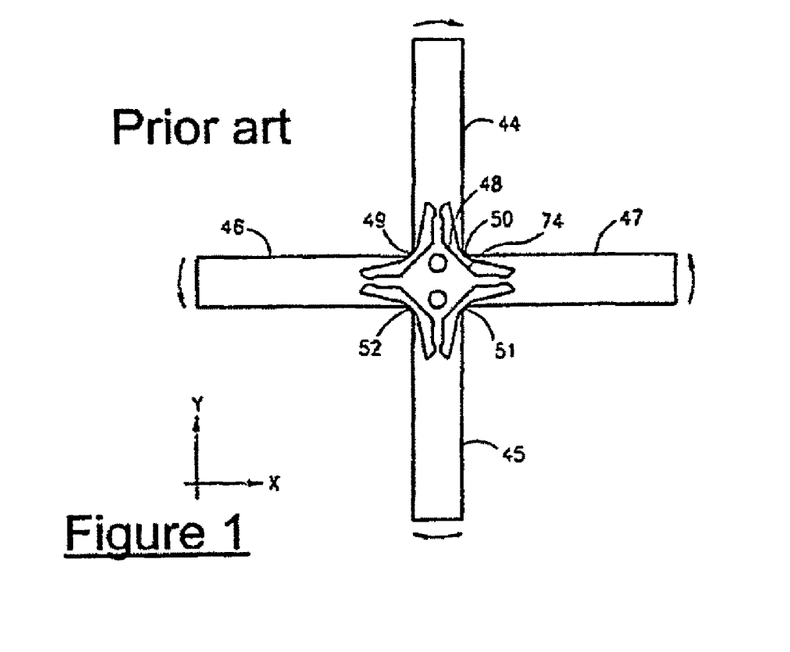
FIG. 1 shows the reference geometry.

The present invention deals with improvements upon the 2-axis gyroscope geometry illustrated in FIG. 15 of U.S. Pat. No. 5,763,781. This geometry is shown in FIG. 1—and hereinafter referred to as the reference geometry which includes four in-plane vibrating members 44, 45, 46, 47 that are narrowed at their bases and supported by a stationary anchor 48. The vibrating members are mutually coupled by means of flexure elements 49, 50, 51, 52 each of which has an in-plane resonant mode (also referred to as drive mode, primary mode, or excitation mode) and an out-of-plane resonant mode (also referred to as secondary mode, sense mode, or Coriolis mode). It should be emphasized that features of the present invention may be applicable to other geometries of vibratory gyroscopes.

As is well known to those skilled in the art Resonator gyroscopes can be operated either in an open loop mode or in a closed loop "force-balance" mode—as described further below.

In general the reference geometry suffers from several deficiencies:

1. Limited In-Plane Coupling Between Adjacent Vibrating Members

In-plane coupling is the ratio of static angular deflection induced in a one member to a deflection forced on an adjacent member. In-plane coupling is required in order to obtain equal amplitudes minimize the effects of production inaccuracies; it is limited to about 10% in the reference geometry.

2. Secondary Resonant Frequency Cannot be Flexibly Selected

Figure 2:
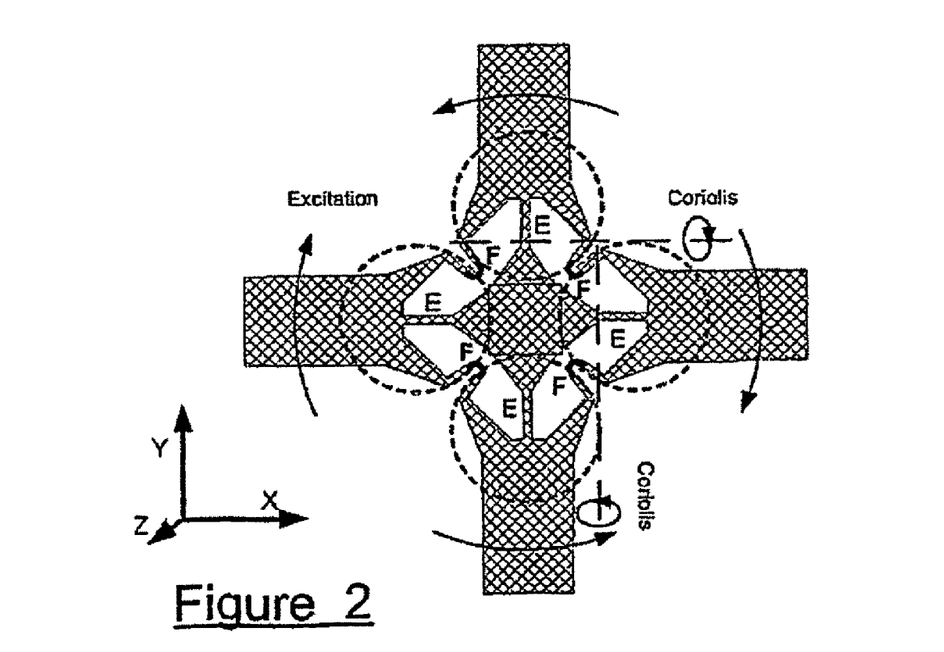
FIG. 2 illustrates the improved mechanical coupling scheme.

It is well known that the sensitivity of a resonator gyroscope is maximized when the resonant frequencies of the drive and the Coriolis modes—depicted by arrows in FIG. 2, are nearly matched. The resonant frequency $\omega = \sqrt{k/I}$ of a flexing beam, either in-plane or out-of-plane, depends on the respective moment of inertia I and stiffness k, where stiffness depends on the beam flexing length L, its width w, and its thickness h. Since the inertia of the vibrating members, as well as their flexing length, are nearly the same for both in-plane and out-of-plane vibration modes, the respective resonant frequencies cannot be brought to nearly the same value unless w nearly equals h—the wafer thickness. As is well known, in order to increase the sensitivity of a resonator gyroscope its excitation frequency should be relatively low, however the large h (thick wafer), required in order to increase the vibrating mass implies a respectively high resonance frequency.

3. Limited In-Plane Vibration Amplitude

In order to maximize the rate-induced Coriolis deflection the in-plane vibration amplitude of members 44, 45, 46, 47 should be as much as allowed by the material elastic limit and geometry. In general, the maximum deflection of a flexing element of length l is proportional to $l^3$. In the reference geometry l is short compared to the physical length of the beam, thus permitting only limited vibration amplitude. Also, it was found that tangential coupling elements 49, 50, 51, and 52 as in FIG. 1 tend to break at relatively small amplitudes, because of stress concentration due to their short lengths.

4. Long Term Instability of the Matching Between the Two Resonant Frequencies

Stability of the scale factor—see below, and of the bias (zero-rate output) are important performance measures of any Resonator gyroscope, whether single-axis or dual-axis. Both are related to the degree of matching between the excitation frequency and secondary-mode resonant frequency over time and temperature. Some have considered such matching an insurmountable challenge—see for example: *An Approach for Increasing Drive-Mode Bandwidth of MEMS Vibratory Gyroscopes*, Cenk Acar and Andrei M. Shkel, JOURNAL OF MICROELECTROMECHANICAL SYSTEMS, VOL. 14, NO. 3, JUNE 2005

The various features of the present invention presented below address one or more of the deficiencies listed above and, in certain implementations, also provide:

1. A force balance loop that operates differentially on the Coriolis induced forces
2. A force balance loop that operates on the common mode out-of-plane deflection to resist Z-axis acceleration from affecting the rate measurement and provide Z-axis acceleration reading.
3. A force balance loop split into a "quadrature" and "in-phase" channels to eliminate the waste of electronic signal dynamic range by the quadrature signal and make it available for the useful signals.
4. An on-line self-test that transparently monitors the primary and secondary modes.

SUMMARY OF THE INVENTION

The present invention is a resonator gyroscope and corresponding method of operation.

According to the teachings of the present invention there is provided, a dual-axis resonator gyroscope comprising: (a) a baseplate carrying a first set of electrodes; and (b) a resonator layer deployed above the baseplate, the resonator layer including an anchored portion rigidly attached to the baseplate and four oscillators each linked to the anchored portion via an integral spring formation configured to allow in-plane angular deflection of the corresponding oscillator around an effective center of rotation, the resonator layer further including mechanical linking elements linking between adjacent of the oscillators such that, when one of the oscillators undergoes a first angular in-plane deflection, the mechanical linking elements induce an opposite angular in-plane deflection of adjacent ones of the oscillators, wherein the linking elements are configured to include at least one portion extending substantially tangentially relative to the effective center of rotation, thereby reducing stresses in the oscillators caused by the mechanical linking elements during relative motion of the oscillators.

According to a further feature of the present invention, each of the linking elements is substantially U-shaped.

According to a further feature of the present invention, each of the oscillators is linked to the anchored portion via a pair of at least two beams.

According to a further feature of the present invention, the at least two beams diverge from the anchored portion towards the oscillator.

According to a further feature of the present invention, the integral spring formation for each of the oscillators includes a torsion beam deployed to reduce mechanical resistance to out-of-plane deflection of the oscillator.

According to a further feature of the present invention, each of the oscillators is substantially triangular.

According to a further feature of the present invention, a total area of the oscillators corresponds to at least 90 percent of an area of a square encompassing the oscillators.

According to a further feature of the present invention, there is also provided a coverplate attached to the resonator layer and carrying a second set of electrodes, the first and second sets of electrodes being substantially symmetrical under reflection in plane subdividing a thickness of the resonator layer.

According to a further feature of the present invention, the baseplate and the coverplate are formed from borosilicate glass and the resonator layer is formed from silicon.

According to a further feature of the present invention, the first set of electrodes includes at least two electrodes underlying each of the oscillators.

According to a further feature of the present invention, the anchored portion and the four oscillators have a single common electrical output connection.

There is also provided according to the teachings of the present invention, a resonator gyroscope comprising: (a) a baseplate carrying a first set of electrodes; and (b) a resonator layer deployed above the baseplate, the resonator layer including an anchored portion rigidly attached to the baseplate and at least two oscillators each linked to the anchored portion via an integral spring formation configured to allow in-plane angular deflection of the corresponding oscillator, wherein the integral spring formation for each of the oscillators includes a torsion beam deployed to reduce mechanical resistance to out-of-plane deflection of the oscillator.

There is also provided according to the teachings of the present invention, a method for operating a resonator gyroscope, the method comprising: (a) providing a resonator gyroscope having: (i) at least one pair of oscillators configured to oscillate in a primary oscillatory direction with a first resonant frequency and in a secondary oscillatory direction perpendicular to the first oscillatory direction with a second resonant frequency, and (ii) an electrically controllable resonance modifier deployed to vary at least one of the first and second resonant frequencies; (b) exciting oscillatory motion of the oscillators in the primary oscillatory direction at the first resonant frequency and detecting a mechanical response of the oscillators in the second oscillatory direction at the first resonant frequency indicative of an inertial rotation rate; and (c) while performing step 13(b): (i) applying an oscillatory force to the oscillators in the second oscillatory direction at each of a pair of test frequencies spaced equally above and below the first resonant frequency, (ii) measuring a resulting amplitude of vibration in the secondary oscillatory direction at each of the pair of test frequencies, and (iii) adjusting the electrically controllable resonance modifier so as to equalize the resulting amplitudes for the pair of frequencies, thereby matching the first and second resonant frequencies.

According to a further feature of the present invention, the electrically controllable resonance modifier includes an electrostatic spring.

According to a further feature of the present invention, the detecting a mechanical response of the oscillators in the second oscillatory direction is performed by supplying a voltage to a first set of electrodes to achieve force balance to cancel deflection of the oscillators in the secondary oscillation direction at the first resonant frequency, and wherein the electrostatic spring employs a second set of electrodes distinct from the first set of electrodes.

According to a further feature of the present invention, the electrostatic spring is actuated so as to substantially cancel out an affect of the force balance on the resonant frequency of the oscillators in the secondary oscillatory direction.

According to a further feature of the present invention, the pair of test frequencies are referred to as the first pair of test frequencies, and the method further includes: (a) applying an oscillatory force to the oscillators in the second oscillatory direction at each of a second pair of test frequencies spaced equally above and below the first resonant frequency by a spacing different from the first pair of test frequencies; (b) measuring a resulting amplitude of vibration in the secondary oscillatory direction at each of the second pair of test frequencies, and (c) deriving from measurements of the resulting amplitude of vibration at each of the first and second pairs of test frequencies an estimation of a gain factor of the oscillators at the first resonant frequency.

There is also provided according to the teachings of the present invention, a resonator gyroscope comprising: (a) at least one pair of oscillators configured to oscillate in a primary oscillatory direction with a first resonant frequency and in a secondary oscillatory direction perpendicular to the first oscillatory direction, (b) a force balance arrangement deployed to supply a voltage to a first set of electrodes to achieve force balance to cancel deflection of the oscillators in the secondary oscillation direction at the first resonant frequency; and (c) an electrostatic spring arrangement deployed to supply a voltage to a second set of electrodes so as to adjust a resonant frequency of oscillation of the oscillators in the second oscillatory direction to match the first resonant frequency, wherein the second set of electrodes is non-contiguous with the first set of electrodes, and wherein the electrostatic spring arrangement is configured so as to apply a voltage to the second set of electrodes so as to substantially cancel out an affect of the force balance arrangement on the resonant frequency of the oscillators in the secondary oscillatory direction.

There is also provided according to the teachings of the present invention, a method for simultaneously measuring common mode and differential mode deflections of a pair of oscillators each disposed between an upper and a lower electrode, the method comprising the steps of: (a) applying a first oscillating electric signal having a first frequency significantly higher than a frequency of oscillator motion between the upper and lower electrodes such that the signal is applied in opposite polarity across the two oscillators; (b) applying a second oscillating electric signal having a second frequency different from the first frequency and significantly higher than a frequency of oscillator motion between the upper and lower electrodes such that the signal is applied with the same polarity across the two oscillators; (c) amplifying a signal derived from a common electrical contact to the pair of oscillators; (d) obtaining from a component of the signal at the first frequency a differential mode deflection of the pair of oscillators; and (e) obtaining from a component of the signal at the second frequency a common mode deflection of the pair of oscillators.

According to a further feature of the present invention, there is also provided a step of deriving from the common mode deflection an indication of linear acceleration.

According to a further feature of the present invention, there is also provided a step of applying to at least one of the upper and lower electrodes a voltage chosen to at least partially cancel the common mode deflection.

According to a further feature of the present invention, there is also provided a step of employing the common mode deflection as an input to a force balance arrangement for closed-loop cancellation of the common mode deflection.

According to a further feature of the present invention, there is also provided a step of measuring a differential mode deflection in a second pair of oscillators each disposed between an upper and a lower electrode, the second pair of oscillators being electrically connected to the first pair of oscillators, the method further including applying a third oscillating signal having the first frequency between the upper and lower electrodes of the second pair of oscillators such that the signal is applied in opposite polarity across the two oscillators, the third signal being at a predefined phase difference to the first signal.

BRIEF DESCRIPTION OF THE DRAWINGS

The invention is herein described, by way of example only, with reference to the accompanying drawings, wherein:

FIG. 5-a is a block diagram of the signal processing of the open loop gyroscope.

FIG. 5-b is a block diagram of the signal processing of the force-balanced gyroscope.

FIG. 7-a shows an ideal phasor relation between the quadrature signal and the coriolis signal.

FIG. 7-b shows a practical phasor relation between the quadrature signal and the coriolis signal

FIGS. 9 a and b Illustrate cross-sections of a preferred embodiment of the invention.

FIG. 10-a illustrates an open-loop embodiment of the invention in which the "quadrature" signals are automatically balanced out by a dedicated force-balance loop.

FIG. 10-b illustrates a split "in-phase" and "quadrature" force-balance loop that preserves the full dynamic range irrespective of the "quadrature" component.

FIG. 11-a illustrates the dependence of the electrostatic spring on the control voltage.

FIG. 11-b illustrates the dependence of the balancing force on the control voltage.

FIG. 11-c illustrates decoupling of the force and spring controls.

DESCRIPTION OF THE PREFERRED EMBODIMENTS

In general the coupling members are aimed to provides, over a certain deflection range, a mechanical linkage between adjacent vibrating elements. The coupling performs a function analogous to a pair of meshed gear wheels—as depicted by the dashed circles in FIG. 2 that explains the improved coupling aspect of the present invention, where the coupling elements 49, 50, 51, and 52 of the reference geometry are replaced with corresponding coupling elements designated by F.

It is evident that a rotation of one member around its hinge point in either FIG. 1 or FIG. 2 induces a counter rotation in the adjacent member, it is also evident that the relative distance between each point on one gear wheel and an opposite point on the adjacent gear wheel, either increases or decreases as rotation takes place (except in the meshing point). As a result the coupling member should be able to endure both bending and elongation/contraction. The coupling members in the reference geometry is relatively short and, in addition, it is radial with respect to said hinge points, therefore, it tends to oppose the rotation by being stressed in both bending and contraction/elongation, thus limiting the rotational motion and the coupling ratio. It was found that a sufficiently long tangential coupling member outperforms the radial one by being resilient against both relative rotation and relative separation change between its two ends. This is met by the U-shaped coupling members F in FIG. 2 which are both tangential in relation to the hinge point, and of relatively long effective length while, at the same time, occupying short radial length.

These tangential couplers maximize the static coupling ratio up to 80% which increases to nearly 100% at the resonant frequency of the vibrating structure. The result is substantially equal vibration amplitudes in all four vibrating members, regardless of manufacturing tolerances, while minimizing stress in the coupling elements and allowing higher vibration amplitudes. The coupling element according to the present could also include a single tangential beam but for symmetry the U-shape is preferable. This element can also be made serpentine (i.e., curving in alternate directions), including more than one U shaped curve to further reduce stress.

Figure 3:
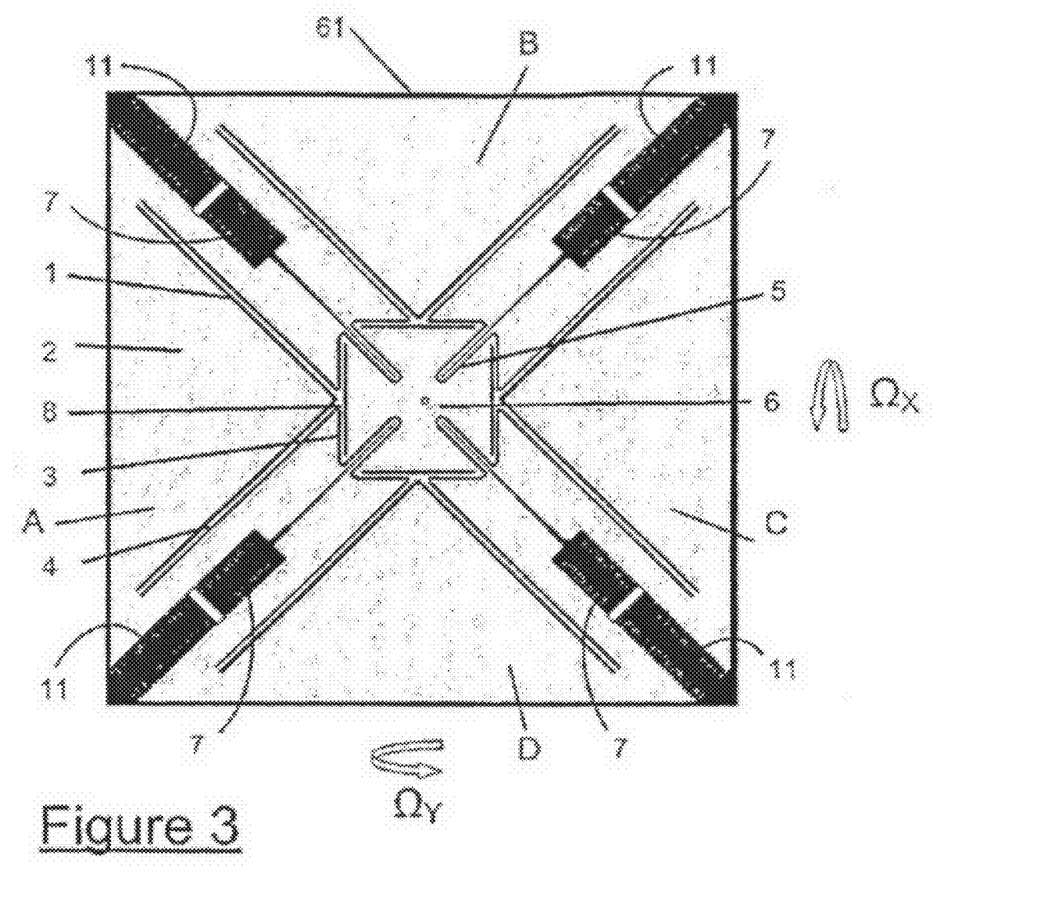
FIG. 3 illustrated the geometry according to the preferred embodiment.
Figure 9A:
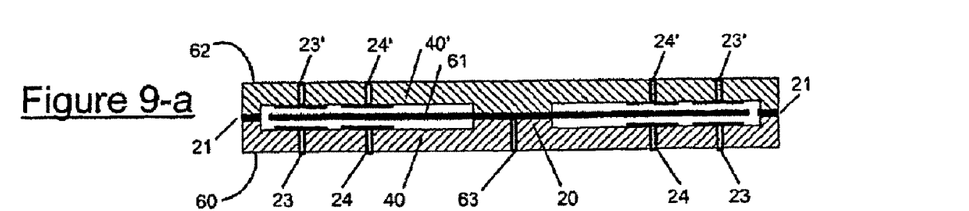
Figure 9B:
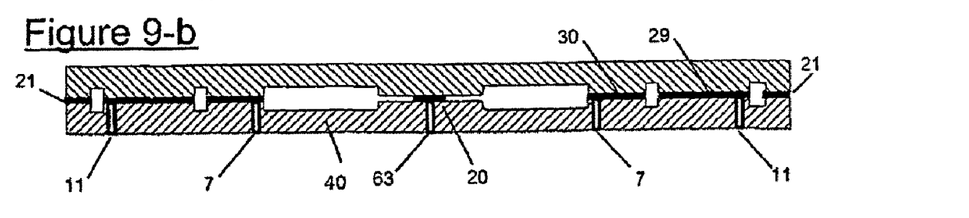

FIG. 3 shows a top view of a preferred geometry of the vibrating structure 61 wherein each of the four members A, B, C and D are triangular, as exemplified by member 2, is coupled by coupler members 5 to its adjacent member. To enable relatively large deflection with minimal stress, each member is supported by two flexing beams 1 and 4 which are long in proportion to the sensor gross dimensions. The beams intersect at point 8 to provide a defined hinge location—this is unlike a single flexing beam in which the rotation center depends on the instantaneous beam deflection. The whole vibrating structure is supported by center part 6, as can be seen in the cross sections in FIGS. 9-a and 9-b. It is well known the sensitivity of a vibrating gyroscope benefits from large vibrating mass, which in a planar geometry translates into a large vibrating area, on the other hand, the cost of a micro machined device increases with its gross area. In a preferred geometry as in FIG. 3 there is substantially no wasted area as most of vibrating structure 61 area serves as vibrating masses, flexing elements or anchor area. Thus the ratio of useful area to total area is higher than 90%.

To overcome the above limitation 2 of the reference geometry a tangential torsion beam 3 is added to the flexing bean, or beams, that support the vibrating mass. This beam is anchored at its two ends which makes its torsion compliance larger than its flexing compliance, which results in a significant decrease in the out-of-plane compliance compared to the decrease in the in-plane compliance. As a result the in-plane compliance can, even for large wafer thickness, be controlled by selecting the width of the flexing beam while the out-of-plane compliance can be decreased by the torsion element to nearly the value of the in-plane compliance—as required.

As detailed further below the in-plane vibrations are excited by double-sided comb drives 11 in FIG. 3 which are energized by two AC voltages of opposite polarities. The resulting displacement is sensed by a second set of double-sided combs 7 which serve as capacitive position pickoffs.

Inertial rotations $\Omega_X$ and $\Omega_Y$ around axes X and Y (see FIG. 2) results in respective Coriolis forces which deflect the four vibrating members out of plane in proportion to $2Vp\Omega$, where Vp is their instantaneous in-plane oscillatory velocity. For example, members A and C will vibrate differentially out-ofplane in proportion to $\Omega_Y$. On the other hand, Z-axis acceleration will result in proportional and simultaneous "common-mode" deflection of all plates. This out-of-plane distortion affects the output rate signals and results in an error known as "g sensitivity. This deflection can be measured by sensing the capacitance between the vibrating members and stationary capacitance plates as described further below. A particularly preferred embodiment of the invention shown in cross section in FIG. 9-a and in diagonal cross section in FIG. 9-b includes capacitance plates disposed on both sides of the vibrating members to provide differential position sensing, thereby providing a stable zero position and a bipolar output of both the rate and acceleration signals. This is since the output residual errors of the symmetrical construction include only odd Taylor terms. The measured acceleration can be used for generating a compensating signal for the induced g-sensitivity. Alternatively, the acceleration induced error in the output rate signals can be eliminating by opposing the out-of-plane deflection using acceleration "force balance", as in FIG. 5-b and detailed further below, with the added advantage that an even more accurate acceleration signal is obtained.

In a preferred embodiment of the invention the vibrating structure is 5×5 mm and is fabricated by deep reactive ion etching (DRIE) process from a 200 μm thick single-crystal Silicon wafer. The Silicon is Anodically bonded to substrate 60 and to optional cover plate 62 in FIGS. 9-a and 9-b both made of borosilicate glass, such as Pyrex®, or other non-conductive material with thermal expansion close to that of Silicon.

It should, however be noted that the rate signals as well as the Z-axis: deflection can also be measured, although with reduced accuracy, without symmetrical construction, or even with capacitive plates on one side only of the vibrating members. The present invention is thus not limited to a symmetrical or to a two-sided to construction.

Figure 4:
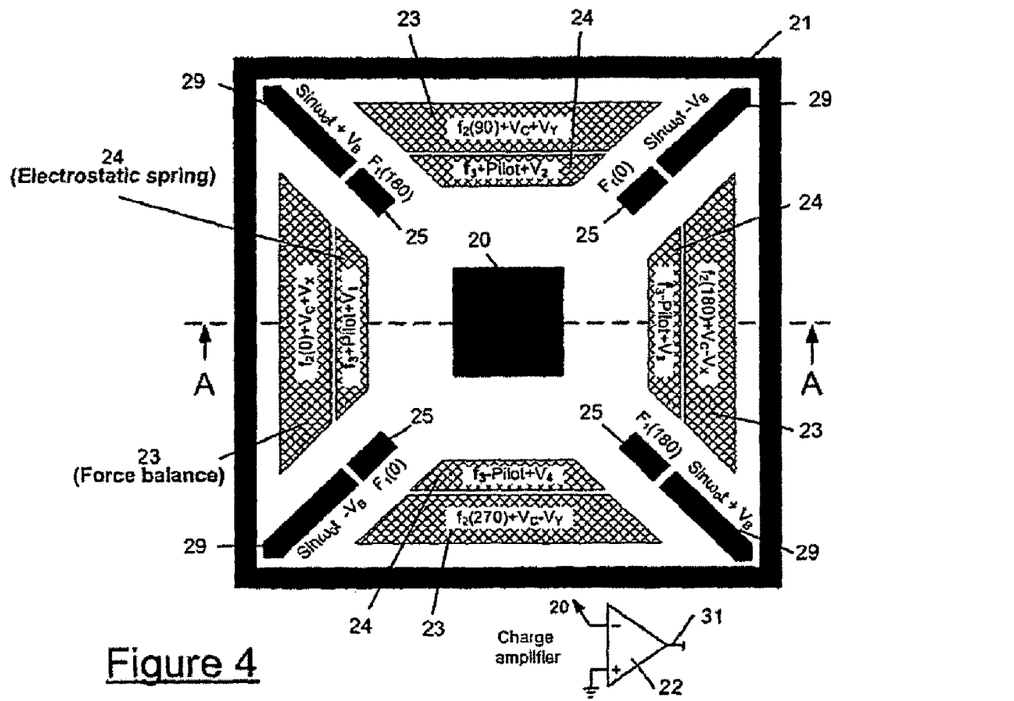
FIG. 4 illustrates the capacitive plates of the rate sensor.

FIG. 4 depicts the top view of the bottom substrate 60 that supports the vibrating structure and combs 7 and 11 in FIG. 3. FIG. 9-a shows its cross-section A-A while FIG. 9-b shows its diagonal cross section with the optional top plate mentioned above. The non hatched regions are shallow cavities which establish the air-gaps between the vibrating members and the trapezoidal capacitive plates which serve the secondary mode functions as detailed below. Area 6 of the vibrating structure of FIG. 3 is attached to area 20 in FIG. 4 and periphery 21 is used for attaching the optional cover plate 62 of FIG. 9-a. The fixed elements of the comb-drive are mounted on raised ridges 29 and are energized by voltage Sin $\omega_0 t$ at the primary-mode resonant frequency—typically a few kHz, riding on bias voltages $V_B$ and $-V_B$ in order to obtain the proper forces polarities. The stationary comb pickoff elements 25 are mounted on ridges 29, 25 and excited by two phase-opposing voltages at frequency $f_1$, typically 100 kHz, depicted by $f_1(0)$ and $f_1(180)$ and supplied by generator 33 in FIGS. 5-a and 5-b. The pickoffs currents induced in the vibrating structure 61 flow through via 63 to the input of charge amplifier 22 in FIG. 5-b and are converted into a voltage signal 31 in FIGS. 5-a and 5-b which is processed as described below.

The secondary-mode vibrations are sensed by capacitive position pickoffs implemented by four trapezoidal plates 23 shown in FIG. 4 and face the vibrating structure 61, as shown in FIG. 9-a, with an air-gap of typically 10 μm established by etching shallow cavity 40 in the bottom plate and cavity 40' in the optional cover plate 62 is employed. The plates are energized by 4-phase AC voltages at frequency $f_2$ typically 50 kHz, that is generated by generator 33 in FIGS. 5-a and 5-b. The induced currents in the vibrating, conductive, structure 61 in FIG. 9 are amplitude modulated by the respective variable air gaps. Since the excitation voltage in each two opposing capacitors are in opposition, the total induced current is proportional to the differential out-of-plane deflection, which is a measure of the inertial rotation rate around the perpendicular axis. For example, an inertial rotation $\Omega_Y$ around the Y axis will influence the sensing capacitors designated by $f_2(0)$ and $f_2(180)$.

Figure 5A:
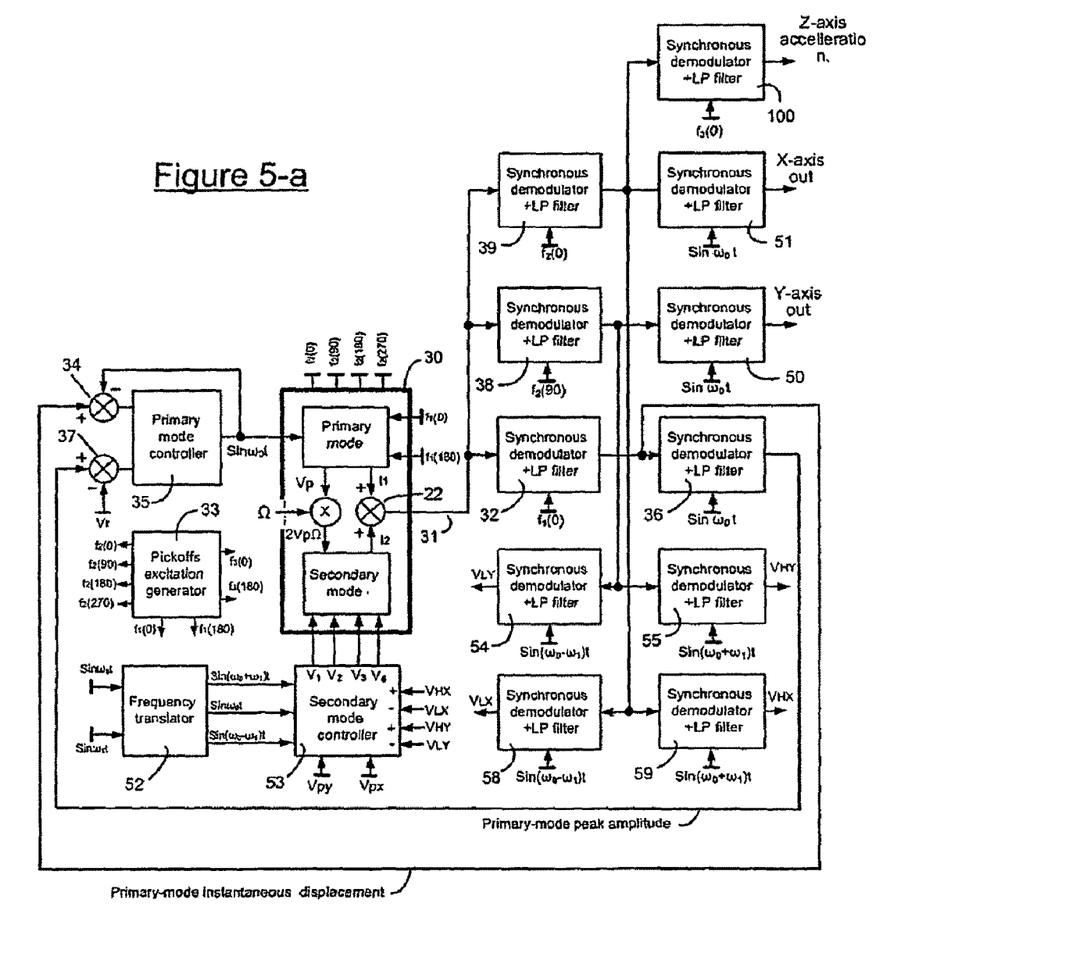
Figure 6:
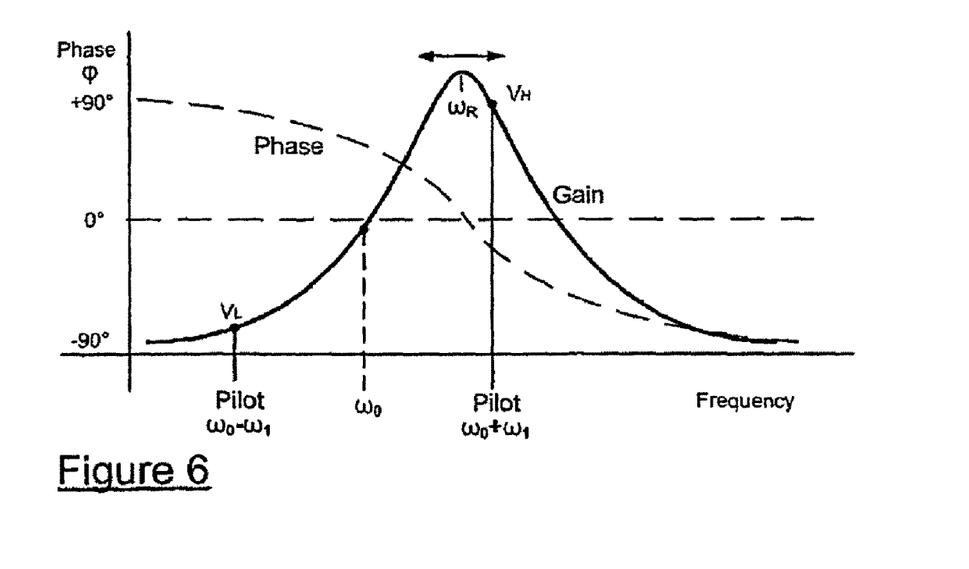
FIG. 6 Illustrates the secondary-mode gain and phase as a function of frequency.

It would be obvious to those versed in the art that the capacitances between the stationary capacitive plates and the vibrating structure, as in FIG. 4, could be implemented by applying a single excitation voltage to the vibrating structure and measuring the induced current in each stationary plate e.g., by connecting a dedicated charge amplifier to each plate FIG. 5-a illustrates a preferred signal generation and processing method in reference to 2-axis gyroscope of the present invention in an open loop mode. It should be noted that, although described herein in the context of a preferred 2-axis gyroscopes the method is applicable to any Resonator gyroscopes. Block 30 represents a vibrating structure while $I_1 \sim \text{Cos } \omega_0 t \text{ Sin } \omega_1 t$ and $I_2 \sim \text{Sin } \omega_0 t \text{ Sin } \omega_2 t$ are the primary-mode and secondary-mode pickoffs currents respectively, these currents along with additional currents described below are summed by summer 22 (same as amplifier 22 in FIG. 4) and converted into voltage 31. The primary-mode instantaneous displacement is obtained by demodulator block 32 that strips off the carrier frequency $f_1$ from $I_1$ and is included in a feedback loop that excites the primary-mode oscillations. This is done by phase comparator 34 which compares the demodulator output phase with that of the drive voltage Sin $\omega_0 t$. Controller 35 adjusts $\omega_0$ until the differential phase is brought to zero. As shown in FIG. 6, this is equivalent to driving the primary-mode at is resonant frequency, which is desirable in order to minimize the required excitation voltage. To stabilize the primary-mode amplitude a second feedback loop is utilized in which demodulator block 36 extracts the vibration amplitude, comparator 37 compares it to reference voltage Vr, and controller 35 adjust the drive amplitude until a match with Vr is obtained.

The rate information signal 31 is proportional to the input inertial rate multiplied by the primary-mode vibration amplitude and also by carrier frequency $f_2$ as detailed below which is applied to plates 23 (and optionally 23' in FIG. 9-a These plates are also used for applying force-balance voltages that comprise a fixed bias voltage Vc and controlled voltages Vx and −Vx for the X-axis and Vy and −Vy for the Y-axis. The output signal is obtained by first stripping the carrier frequency $f_2$ by synchronous demodulators and filter blocks 38 and 39 to obtain two signals at frequency $\omega_0$. These signals are amplitude modulated by the respective inertial rates and their two components can be separated since a demodulator is only sensitive to frequency components in phase with its reference—either $f_2(0)$ or $f_2(180)$. Additional demodulator blocks 50 and 51 employ Cos $\omega_0 t$ as a reference to strip-off the vibration carrier at frequency $\omega_0$ and obtain the inertial rotation rate output signals. As is well known to those skilled in the art, 90° phase shifted references are needed since the Coriolis signals are shifted by 90° relative to the primary-mode vibrations.

Figure 5B:
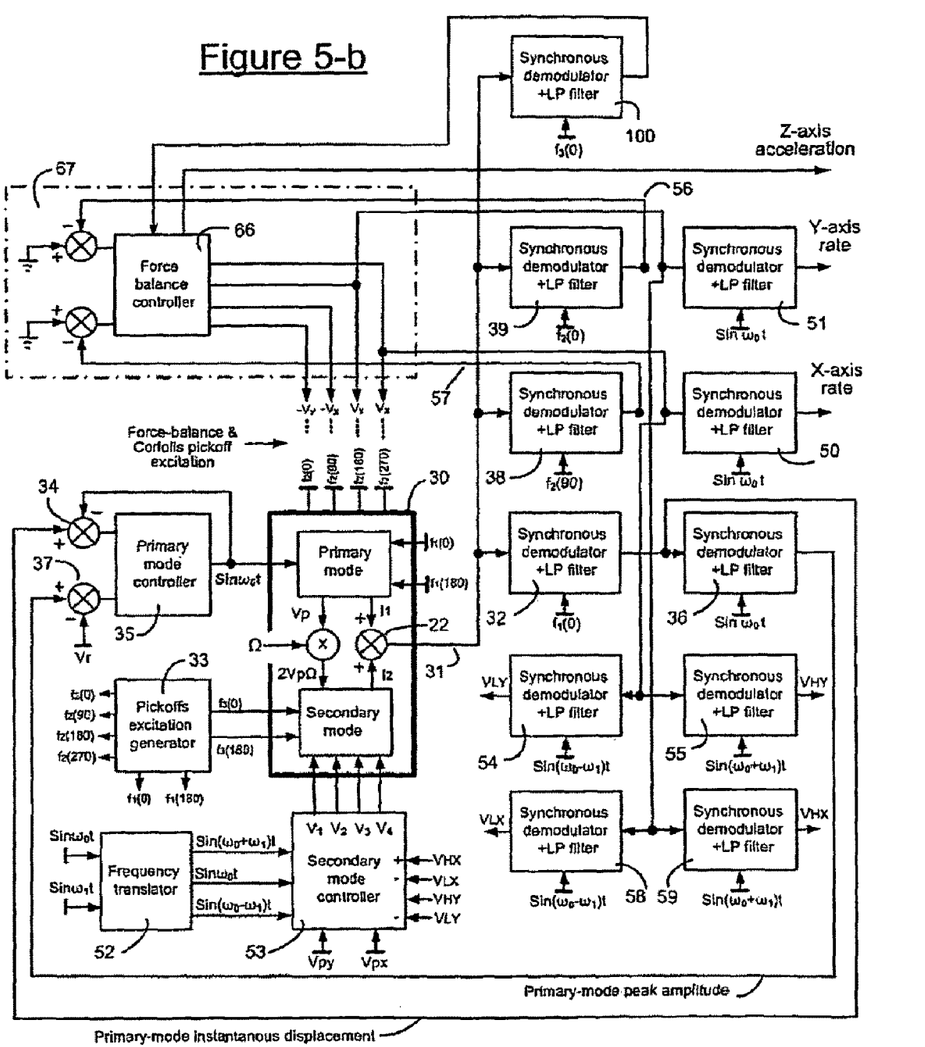
Figure 7A:
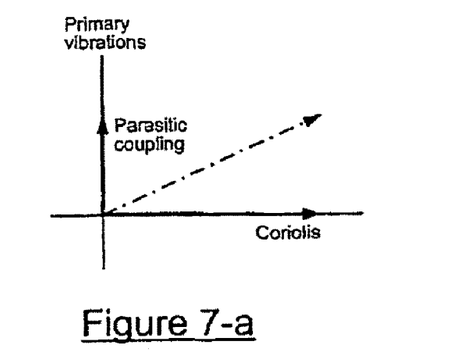
Figure 7B:
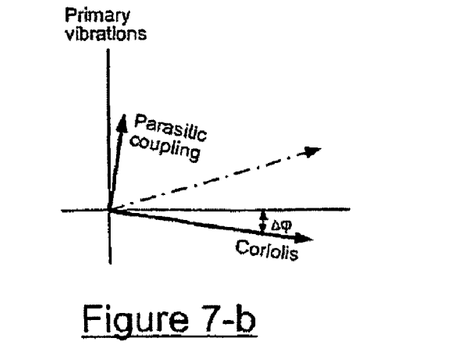

In practice the secondary-mode vibrations in a Resonator gyroscope include not only the Coriolis acceleration induced vibrations—which are in phase quadrature with the primary-mode vibrations (Y-axis), but also an in-phase vibration component that is parasitically coupled from the primary-mode vibration. This component, shown as a phasor in FIG. 7-a, is conventionally referred to as "Quadrature" and would ideally be ignored by demodulators 50 and 51 in FIGS. 5-a and 5-b due to its quadrature phase, without affecting the output. This is not the case, however, because of two reasons:

1. As shown in FIG. 6, a mismatch between the secondary-mode resonant frequency $\omega_R$ and the vibration frequency $\omega_0$ will result in a parasitic phase shift and—where, as shown in FIG. 7-b,—the "quadrature" signal will have a component in phase with the Coriolis signal and appear as an output error. The frequency matching loop actually restores the phase relation of FIG. 7-b to that of FIG. 7-a by minimizing the phase shift.

2. Even if the phase of the "quadrature" signal were restored to the relation shown in FIG. 7-a, it could still occupy a significant portion of the signal dynamic range of the signal 31 in FIGS. 5-a and 5-b.

Figure 10B:
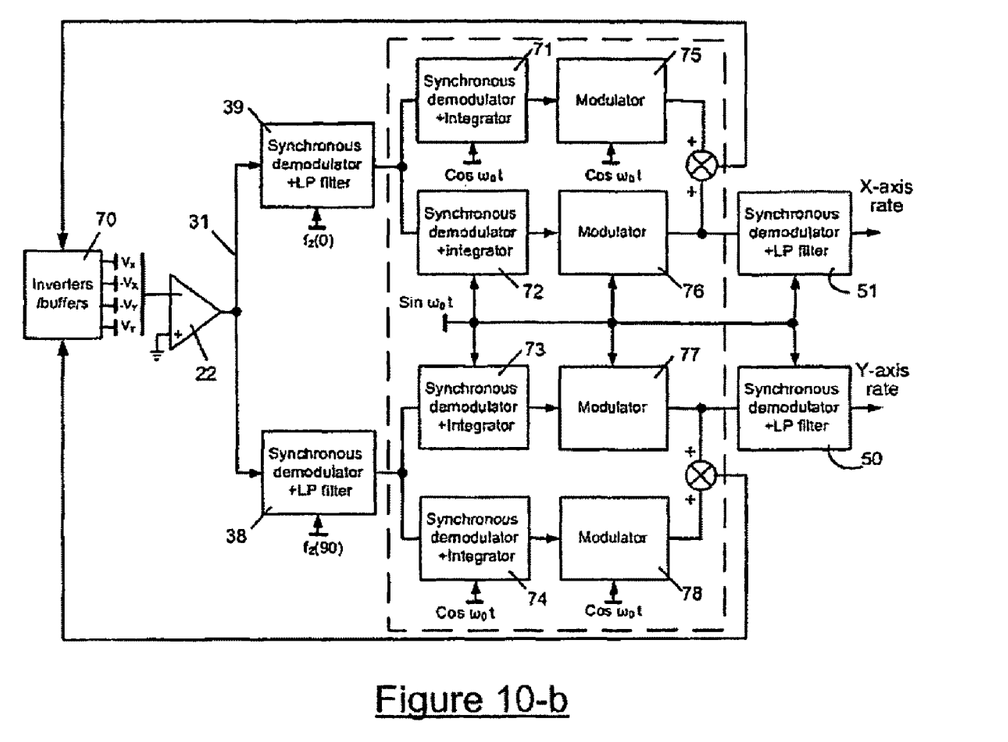

The "quadrature" signals can be canceled as in FIG. 5-a by experimentally adjusting voltages Vpx and Vpy. These voltages are converted in block 53 into proportional voltages ±Vpx Sin $\omega_0$t and +Vpy Sin $\omega_0$t. which are later summed with voltages $V_1$, $V_2$, $V_3$, and $V_4$—described below, to generate out-of-plane forces that oppose the original secondary-mode parasitic vibrations. This individual adjustment can be implemented automatically in a closed-loop, as illustrated in FIGS. 10-a and 10-b and described further below.

A well known practice in prior art has been to match frequency $\omega_R$ to $\omega_0$ by adjusting a so called electrostatic spring which depends on a DC voltage (two voltages in a dual-axis gyroscope). An electrostatic spring has a negative spring constant and when combined with a mechanical spring tends to soften it, in a mechanical resonator this amounts to lowering the resonant frequency. However, this open-loop method is inadequate since the phase dependence on frequency in a high Q resonator—required for achieving high sensitivity—is extremely high and long term matching cannot be guaranteed. In the present invention an automatic resonance matching is obtained via a closed-loop by using a method, which is applicable to both single and dual-axis resonator gyroscopes. The method is based on the fact that two different frequencies (pilot signals) would excite equal response in a resonant vibrating structure only if they are located nearly symmetrically relative to $\omega_R$—see FIG. 6.

Block 52 in FIGS. 5-a and 5-b represents a frequency translator that generates two pilot signals at frequencies $\omega_0+\omega_1$ and $\omega_0-\omega_1$ respectively, where $\omega_0$ is the primary-mode vibration frequency and $\omega_1$ is a predetermined frequency offset which roughly equals the sensor bandwidth, but otherwise is not critical. Secondary mode controller block 53 generates four control voltages $V_1$, $V_2$, $V_3$, and $V_4$—which are generated as described below, and are summed with the respective the pilot signals, and then applied to a second set of capacitive plates 24 and optionally to plates 24' shown in FIG. 4 and FIG. 9-a. These voltages control, through an electrostatic spring, the secondary-mode resonant frequencies of the respective vibrating members to modify, in a closed loop manner, the corresponding resonant frequency $\omega_R$ in each axis until it equals $\omega_0$. Since the feedback loop is designed to compensate slow varying influences, such as temperature, it has a narrow bandwidth and can, therefore, handle pilot signals which are sufficiently weak to be transparent to the gyroscope operation. It should be noted that in the present invention the secondary-mode (Coriolis) resonant frequency $\omega_R$ is that of the differential deflection mode of each two opposing vibrating members in the respective axis, therefore the pilot signals are also applied differentially to each pair of opposing vibrating members. The vibration amplitudes in the Y-axis which result from the pilot excitation are detected by blocks 54 and 55 in FIGS. 5-a and 5-b and are converted to corresponding signals $V_{LY}$ and $V_{HY}$. In a similar manner in the X-axis blocks 58 and 59 generate signals $V_{LX}$ and $V_{HX}$. These voltages are designated collectively as $V_H$ and $V_L$ in FIG. 6. The differences $V_{LY}-V_{HY}$ and $V_{LX}-V_{HX}$ are employed by block 53 to generate the above four control voltages $V_1$, $V_2$, $V_3$, and $V_4$ Besides serving the resonance frequency lock loop the detected pilot signals $V_H$ and $V_L$ may serve for built-in testing of the of the Coriolis signal channel. In combination with a similar monitoring of the primary vibrations the overall proper functioning of the gyroscope is validated in a manner that is transparent to the gyroscope operation. This is in contrast with prior art resonator gyroscope in which the Coriolis channel could be monitored only through interfering with the normal gyroscope operation i.e., by physically applying input rate to the gyroscope in order to excite the Coriolis channel and validate operation.

Figure 8:
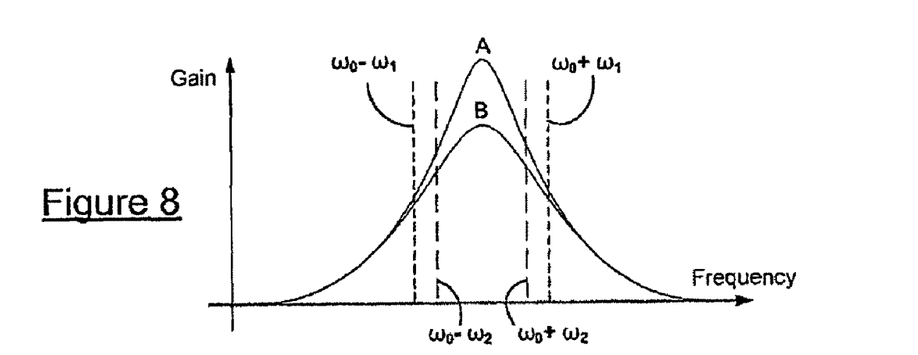
FIG. 8 illustrates resonant curves with different damping coefficient.

In open-loop Resonator gyroscopes, the scale factor (ratio of the output voltage to input angular rate) is known to be proportional to the peak of the secondary-mode resonance curve, as in FIG. 6. On the other hand, the frequency-normalized transfer function of the resonant vibrating structure is known to be equal to $A(\omega/Q)/(\omega^2+\omega/Q+1)$ where the peak value depends on both A and Q where A is the total gain including the electronics and Q is the quality factor which is inversely proportional to the damping and is mainly dependent on the air pressure (or vacuum level). Since both factors may exhibit long term instability stable scale factor is difficult to guarantee without using force balance The present invention overcomes the gain uncertainty without using force balance through identifying the transfer function of the secondary resonator—without directly exciting it or otherwise disturbing the gyroscope operation From FIG. 6 it is evident that the peak gain depends on both A and Q of the resonator, therefore when $\omega_0=\omega_R$ the sum of the two pilot signals is affected by both and is not sufficient for the peak gain determination. This is illustrated in FIG. 8 that shows two resonance curves A and B of the same resonator but with different A and Q the difference could be for example from deterioration of the vacuum and subsequent change of the damping. It can be shown that the peak gain can be determined unambiguously if the gain at two points on one slope of the gain curve is known. To obtain two such values the present invention employs two sets of pilot signals at frequencies $\omega_0\pm\omega_1$ and $\omega_0\pm\omega_2$ both symmetrical relative to $\omega_0$. By measuring the respective amplitudes in FIG. 8 and swapping $\omega_1$ and $\omega_2$ in blocks 54, 55, 58, and 59 in FIGS. 5-a and 5-b the required values can be obtained without actually disturbing the resonator at, or near, its resonant frequency—which correspond to the useful operating bandwidth of the gyroscope.

FIG. 9-a illustrates the bottom substrate 60 on which the vibrating structure is mounted, the substrate includes plated vias 23, 24 that are connected to the respective trapezoidal plates. The optional cover plate 62 includes similar plated vias and plates 23', 24' which are facing the vibrating structure on it top side and are energized with pick-off voltages of opposite polarity to those of the bottom substrate 60. The cover plate top substrate 62 makes possible the symmetrical construction, described above, as well as an hermetic seal.

The optional block 67 in FIG. 5-b provides force-balancing by amplifying the secondary-mode position signals 56 and 57 and applying proportional restoring forces in the Z-axis by means of voltages $V_Y$, $V_X$, $-V_Y$ and $-V_X$. These voltages are added to DC bias voltages Vc and to corresponding excitation pickoff signals at frequency $f_2$, described above, and applied to plates 23 in FIG. 4. It should be noticed that the restoring forces oppose the total secondary-mode vibrations which includes both Coriolis and the "quadrature" components, therefore the corresponding voltages should be demodulated by blocks 50 and 51, as before, in order to obtain the output signals. As already mentioned the larger the "quadrature" component the smaller is the available dynamic range and this applies regardless of whether the gyroscope is operated in an open or closed loop.

FIG. 10-a illustrates an open-loop embodiment of the invention in which the "quadrature" signals are automatically balanced out without the need for individual device calibration. The method is based on a dedicated force-balance loop that operates on this component only. The two axes signals are separating by blocks 38 and 39, as before, blocks 71, and 74 provide voltages proportional to the respective "quadrature" components which are further amplified by the integrators included in these blocks. The resulting amplitudes are multiplied in blocks 75 and 78 by the vibration signal to obtain the "quadrature" components, free of the Coriolis component, these components are then converted by means of block 70 into complementary voltages that generate the balancing forces. As a result the rate signals are free of the "quadrature" component and can be further processed. In FIG. 10-a the rate signals are processed in an open-loop mode by demodulator and filter blocks 50 and 51, as before, except that the "quadrature" component is absent and the full dynamic range is available.

FIG. 10-b illustrates an embodiment similar to the previous one, in which "quadrature"—free Coriolis signals are obtained by blocks 72, 76, and 73, 77, and combined with the "quadrature" signals for force balancing. The Coriolis components are processed by blocks 50, 51 to obtain the rate signals, with the advantages of force-balance operation, and automatic "quadrature" cancellation. The method is based on splitting a conventional force balance loop into an "in-phase" channel and "quadrature" channel while the signal amplitudes are still small (at the preamplifier output) and separately amplifying each component. As a result the full dynamic range for the "in-phase" Coriolis signal is preserved to allow maximum resolution.

As described above, the four out-of-plane deflections provide a measure of the Z-axis acceleration, either in open loop mode, as in FIG. 5-a, or using force-balance, as in FIG. 5-b. In both cases all four plates 23 in FIG. 4 are excited by a AC voltage at frequency $f_3(0)$ which is generated by block 33. The excitation voltage is added to the pilot signals while its opposite $f_3(180)$ is connected to the opposing plates on cover plate 62 in FIG. 9. The corresponding component at frequency $f_3$ of signal 31 in FIG. 5-b is then converted into a proportional signal by a demodulator and filter block 100 to provide the polarity and magnitude of the sensed deflection. In the force balance mode it is then applied to block 66 in which a proportional rebalancing voltages are generated and included in voltages $V_Y$, $V_X$, $-V_Y$ and $-V_X$.

In practice the implementation of the force-balance and the control of electrostatic spring for secondary resonant frequency control using capacitive interaction are more complicated than described above because of an undesired influence of the force-balance voltages on the electric spring which would affect the secondary resonant frequency, as detailed below. Note that concept below can be but is not implemented in either FIG. 5-a, or FIG. 5-b.

Figure 11A:
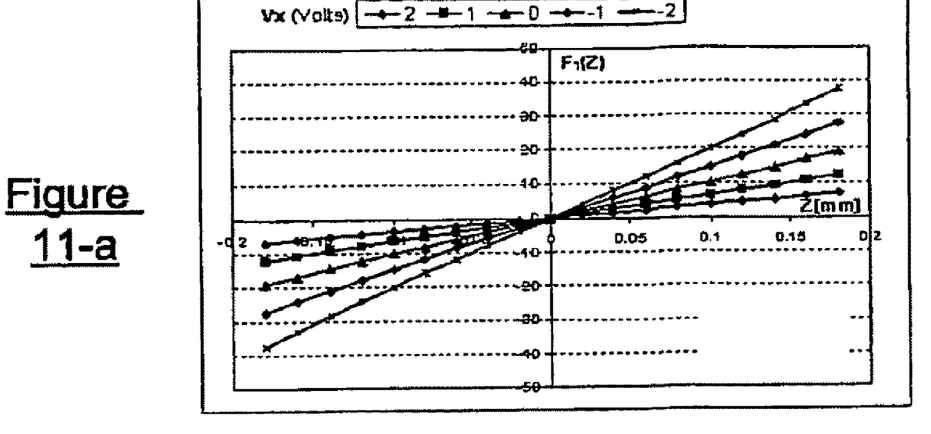
Figure 11B:
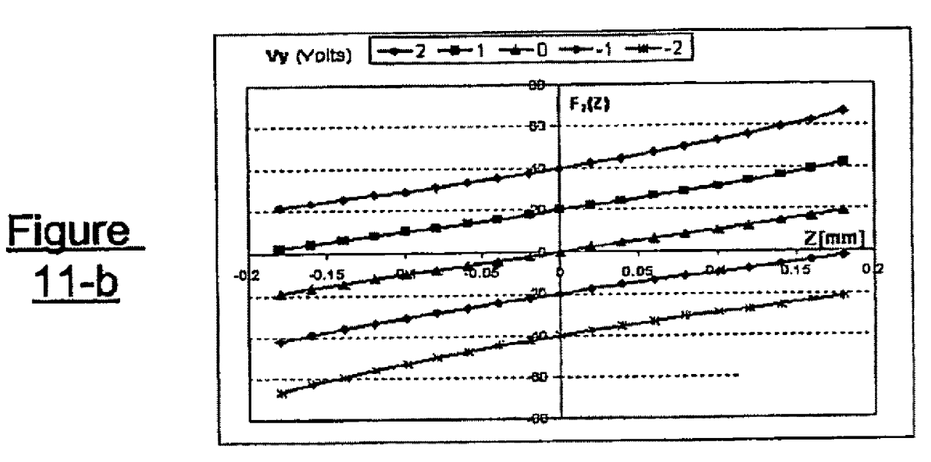
Figure 11C:
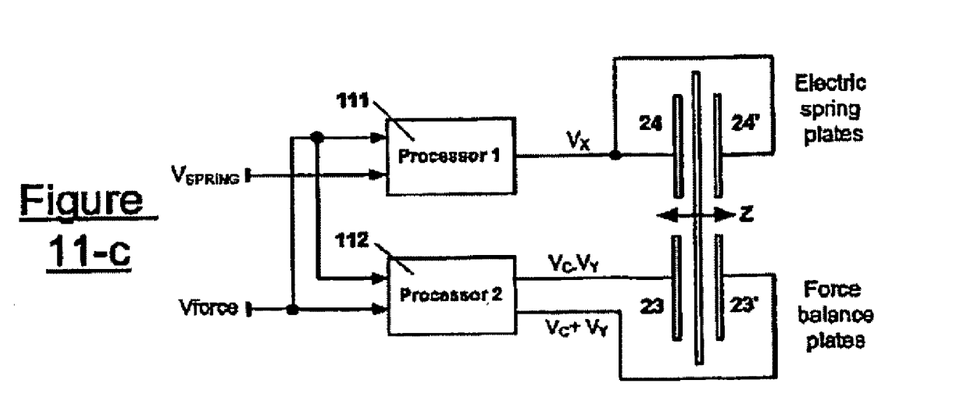

FIG. 11-c illustrates capacitive plates of any of the four plates 24 and 24' of FIG. 9-a. For clarity of the explanation the plates are assumed to be at a voltage $V_{SPRING}$. If the air gap between each plate and its respective vibrating member, which is held at zero voltage, is d, then an out-of-plane displacement Z of the vibrating member will result in a force $F_1(z)$ that can be shown to be given by:

$$F_1(z) \propto \frac{(V_{SPRING})^2}{d^3} \cdot z \tag{1}$$

Expression (1) represents a negative spring constant i.e., a force that, unlike a mechanical spring, operates in the direction Z. If combined with a mechanical spring and mass it will reduce the resonant frequency. FIG. 11-a illustrates the Z-axis restoring force as a function of the Z-axis displacement for several values of $V_{SPRING}$.

Similarly for clarity of the explanation the voltages on plates 23 and 23' in FIG. 9-a are referred to as $V_C+V_Y$ and $V_C-V_Y$, where $V_C$ is a bias voltage and $V_Y$ is a control voltage. FIG. 11-b shows the resulting forces exerted on the vibrating plate with several values voltage $V_Y$, as derived from the approximation:

$$F_2(z) \propto \frac{V_C V_Y}{d^2} + \frac{(V_C^2 + V_Y^2)}{d^3} \cdot z \tag{2}$$

The first term of expression (2) represents a force component which is linearly dependent on $V_Y$, as required for force-balance; however, the second term represents a spring component that combines with the spring in expression (1). In other words, unless compensated for, the force balance loop interferes with the secondary-mode resonant frequency control loop.

In accordance with a preferred embodiment of the present invention illustrated in FIG. 11-c the voltages on plates 23, 23' and 24, 24' are generated by processors 111 and 112 from command signals $V_{SPRING}$ and $V_{FORCE}$ such that an increase in the spring term in expression (2) is compensated by a corresponding decrease of the spring term in expression (1), to make the variable spring controlled solely by $V_{SPRING}$ while the force balance controlled solely by $V_{FORCE}$.

Although the invention has been described in reference to 2-axis Silicon single-crystal fabrication teachings of the present invention are, unless otherwise specified, also applicable to single-axis resonator gyroscopes and may be fabricated using different technologies.

It will be appreciated that the above descriptions are intended only to serve as examples, and that many other embodiments are possible within the scope of the present invention as defined in the appended claims.

What is claimed is:
1. A dual-axis resonator gyroscope comprising:
   (a) a baseplate carrying a first set of electrodes; and
   (b) a resonator layer deployed above said baseplate, said resonator layer including an anchored portion rigidly attached to said baseplate and four oscillators each linked to said anchored portion via an integral spring formation configured to allow in-plane angular deflection of the corresponding oscillator around an effective center of rotation, said resonator layer further including mechanical linking elements linking between adjacent said oscillators such that, when one of said oscillators undergoes a first angular in-plane deflection, said mechanical linking elements induce an opposite angular in-plane deflection of adjacent ones of said oscillators, wherein said in-plane angular deflections are excited by means of electrostatic comb drives.
2. The resonator gyroscope of claim 1, wherein each of said oscillators is substantially triangular.

3. The resonator gyroscope of claim 1, wherein a total area of said oscillators corresponds to at least 90 percent of an area of a square encompassing said oscillators.

4. The resonator gyroscope of claim 1, further comprising a coverplate attached to said resonator layer and carrying a second set of electrodes, said first and second sets of electrodes being substantially symmetrical under reflection in plane subdividing a thickness of said resonator layer.

* * * * *